April 18, 1961  J. G. FISHER  2,980,437
DOFF TRUCK BOXES AND THE LIKE HAVING RUB GUARDS AND BUMPERS
Filed Jan. 28, 1959                                    2 Sheets-Sheet 1
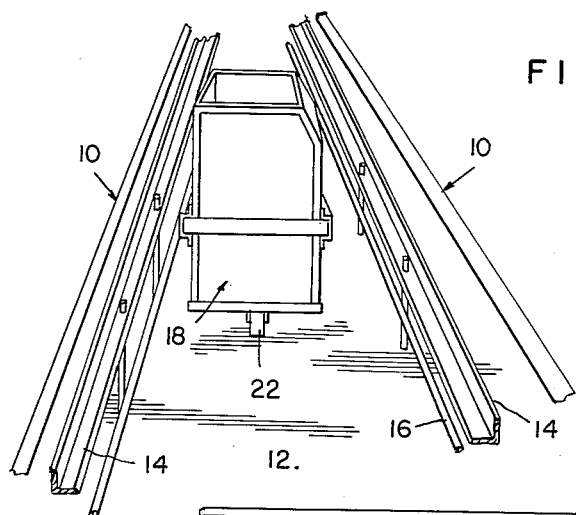
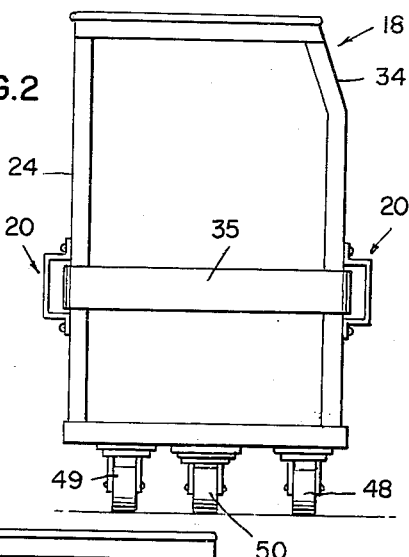
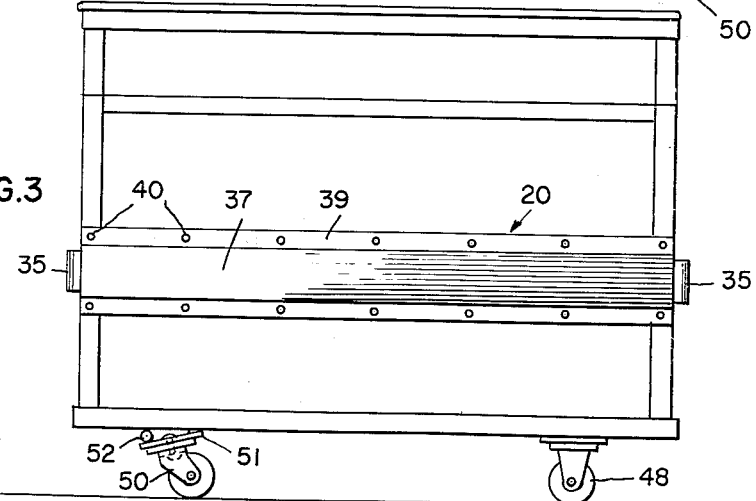
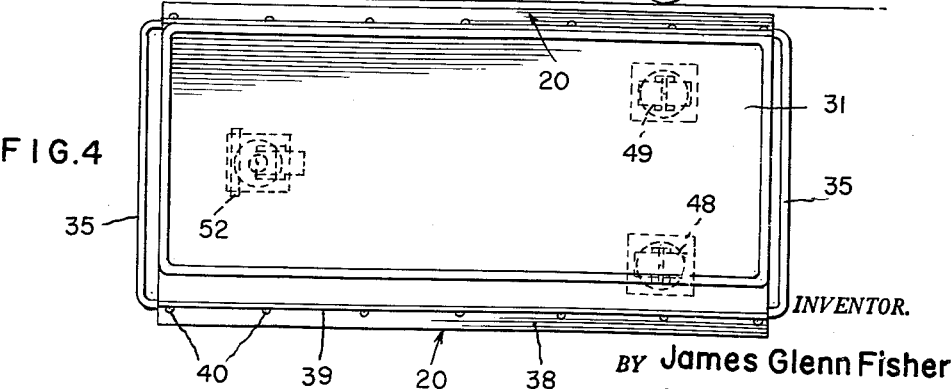
INVENTOR.
BY James Glenn Fisher
Shoemaker & Mattare
ATTYS April 18, 1961  J. G. FISHER  2,980,437
DOFF TRUCK BOXES AND THE LIKE HAVING RUB GUARDS AND BUMPERS
Filed Jan. 28, 1959  2 Sheets-Sheet 2
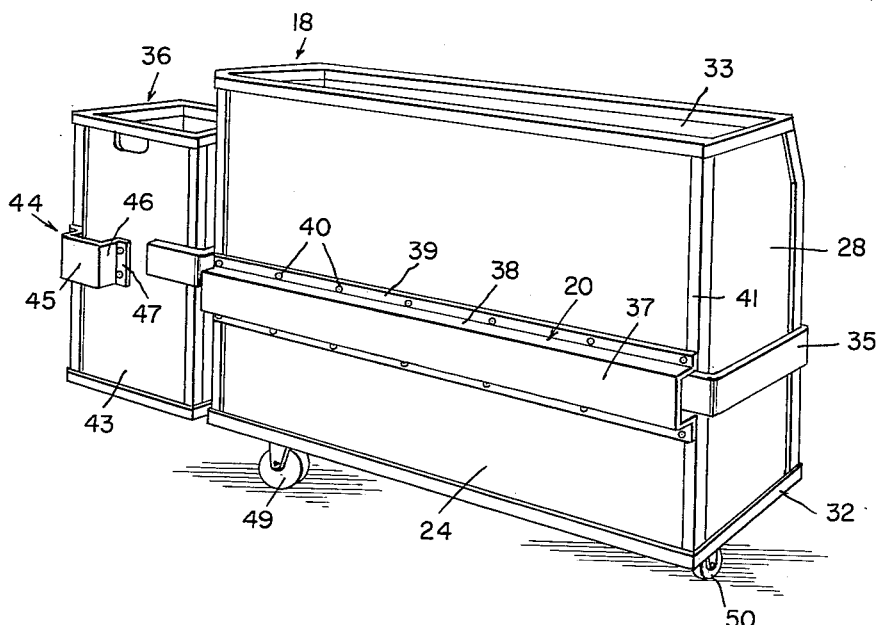
FIG.5
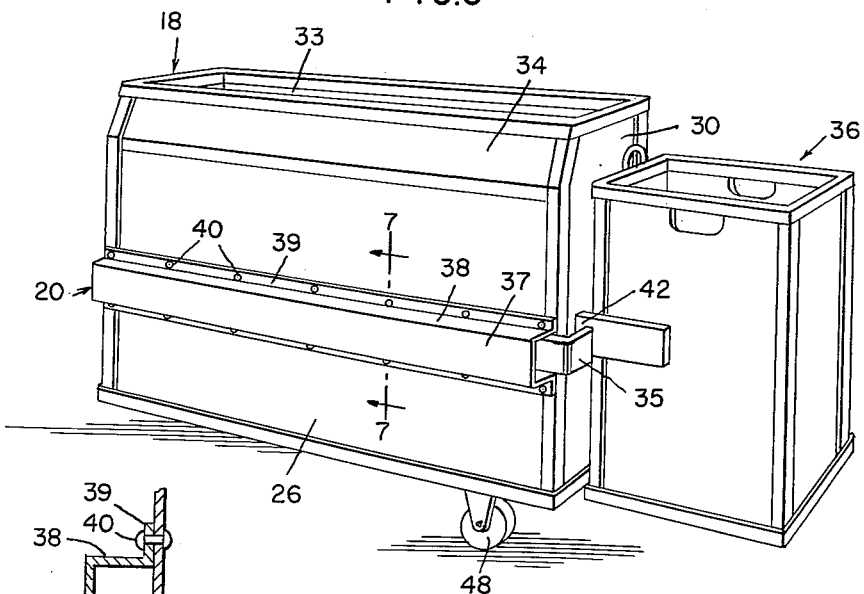
FIG.6
FIG.7
INVENTOR.
James Glenn Fisher
BY
Shoemaker & Mattare
ATTYS

United States Patent Office 2,980,437
Patented Apr. 18, 1961

2,980,437

DOFF TRUCK BOXES AND THE LIKE HAVING RUB GUARDS AND BUMPERS

James Glenn Fisher, Hartwell, Ga., assignor to Fisher Manufacturing Company, Inc., Hartwell, Ga., a corporation of Georgia Filed Jan. 28, 1959, Ser. No. 789,665

4 Claims. (Cl. 280—79.2)

This invention relates generally to equipment for use in association with textile machines and the like and is directed more particularly to improvements in doff truck boxes and other boxes used around textile machines.

In the use of doff trucks between spinning frames, for example, the worker moving the truck finds it difficult to keep the truck running straight with the result that the trucks frequently strike an adjacent frame and, therefore, there is danger of the truck damaging some part of the frame. This is especially true in those frame constructions where there is no guard on the machine base rail.

It is a particular object of the present invention in the light of the foregoing, to provide a doff truck box or other truck supported or wheel supported boxes designed to be operated in the aisles between textile machines, with a rub guard which will function, in the event that the truck or wheeled box is not kept running straight by the operator, to fend off the box from the adjacent machine. The spinning frames or spinning machines are equipped with base rails which are located so that by the use of a rub guard at the proper elevation on the box, the rub guard may engage the base rail and thus prevent the box from coming close enough to the machine to damage any projecting parts thereof.

It is another object of the invention to provide in association with a wheel or truck supported doff box and a smaller box mounted on one end of the doff box, a rub guard on the doff box in association with a bumper on the smaller box, which bumper, by being brought against the base rail of the spinning frame, will assist the operator of the truck in controlling the movement of the box or, on the other hand, the bumper will also function to prevent the smaller box, mounted upon the truck supported doff box, from running too close to the machine frame especially where no guard may be on the base rail thereof, and doing damage to some part of the machine.

A further object of the invention is to provide a truck supported box or wheel supported box with a novel free wheel arrangement by means of which the operator or worker moving the box is able to keep the truck running straight in the aisle between adjacent machines.

The invention broadly contemplates the provision of a doff truck having a rub guard secured longitudinally of each of the long sides thereof, which rub guard is of substantial width in the vertical direction so as to provide a wide area for contacting either the base rail of a machine or the guard on the base rail and thus maintaining the side of the box spaced a substantial distance from the machine. The rub guard in addition to functioning in the manner stated, also acts as a stiffener which reinforces the side of the box.

The doff box may also be provided with means for mounting upon the rear end thereof a smaller box which is used for collecting or carrying empty bobbins and such smaller box is provided with a bumper which is disposed in substantially the same horizontal plane as an adjacent rub guard when the smaller box is mounted on the rear end of the truck or wheel supported doff box and such bumper projects laterally to a slightly greater distance than the rub guard and may be used by the operator as a means for keeping the doff box running along a straight path by bearing the bumper against the base rail or guard of the adjacent frame.

The novel supporting wheel arrangement for the doff box or the truck on which the box is placed consists in the placement of two fixed wheels or rollers adjacent to the rear end of the doff box and a caster wheel or roller located adjacent to the front end of the doff box and on the longitudinal center of the latter and tilted so that the wheel is disposed rearwardly of its connection with the bottom of the box and functions as a caster so as to assist the operator in rolling the box along a straight path. Further in the novel wheel arrangement the pair of wheels or rollers at the rear end of the box are spaced transversely of the box and the one thereof at the rear right hand side of the box is set in from the side farther than the roller or wheel on the left hand side of the box.

The invention will be best understood from a consideration of the following detail description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Fig. 1 is a view in perspective illustrating more or less diagrammatically an aisleway between the frames of a pair of machines such, for example, as frames of spinning machines, and showing in the aisle a roller supported doff box equipped with rub guards in accordance with the present invention;

Fig. 2 is a view in end elevation of a wheel supported doff box showing the rub guards thereon, the view looking at the rear end of the box and illustrating the rear wheels and caster wheel;

Fig. 3 is a view in elevation of the left hand side of the box structure shown in Fig. 2;

Fig. 4 is a view in top plan of the doff box;

Fig. 5 is a view in perspective of the right side of the doff box and showing a bobbin box mounted or hung upon the rear end thereof and showing the rub guard on the doff box and the bumper on the smaller bobbin box;

Fig. 6 is a view in perspective of the left hand side of the boxes shown in Fig. 5;

Fig. 7 is a section taken substantially on the line 7—7 of Fig. 6.

Referring now more particularly to the drawings, in Fig. 1 there is illustrated the representation of portions of two adjacent textile machines, such as spinning machines, which are arranged in longitudinal side by side relation, and the portions of the machines shown are designated generally by the reference numeral 10 and the aisle therebetween is designated 12. The machine frame include base rails 14 and in certain machines such base rails 14 may have mounted thereon or attached thereto guard rails which are here designated 16.

The numeral 18 generally designates, in position in the aisle between the guard rails, a doff truck equipped with elements of the present invention such, for example, as the rub guards which are generally designated 20 and the caster wheel and fixed wheels or rollers, the caster wheel only being here shown at the front end of the truck and generally designated 22.

The doff truck which is generally designated 18 may be of any desired form or construction and the box portion thereof which embodies the longitudinal right and left vertical walls 24 and 26, respectively, and front and rear end walls 28 and 30, respectively, may be in a form permitting it to be removably mounted upon a roller supported truck base or it may have the supporting rollers directly attached to the bottom thereof. In the present case the bottom of the box is designated 31 and the lower part or bottom of the box is attached to the base frame 32. However, as previously stated, it is to be understood that the present invention is not limited in any respect either to a doff truck structure in which the box is separately mounted upon the wheel supported base or to a structure in which the supporting wheels are attached directly to the bottom of the box and accordingly the frame which is designated 32 may represent either a truck base or an integral part of the box bottom.

The box has an open top as shown at 33 and the upper portion of the left side wall thereof is inclined inwardly through a portion of its height as indicated at 34 to facilitate the placement of the box close to the inclined lower portion of a spooler, when the box or doff truck structure is to be used as a spooler box or spooler trough. However, the left side wall of the box may be perfectly straight or vertical from top to bottom like the opposite or right side wall where the box is to be used between spinning machines.

Secured across each end wall of the doff truck box and spaced slightly from the wall is a flat bar 35 for facilitating the attachment to the box either of another similar box or a smaller bobbin box such as is shown in Figs. 5 and 6 and generally designated 36.

In accordance with the present invention each of the longitudinal side walls of the doff truck box has secured longitudinally of the outer side thereof a rub guard, hereinbefore referred to and generally designated 20. Thus rub guard may be of any suitable material or construction, but it is preferably formed of suitable heavy sheet metal shaped to a channel form whereby to have the flat relatively wide plate 37 bordered along each longitudinal edge by the right angularly extending flange 38 which in turn is joined to the outwardly extending longitudinal attaching strip 39. The rub guard is secured by means of bolts or rivets passed through the strip portions 39 into the adjacent side wall as indicated at 40 and certain of these bolts or rivets may be fixed in the corner vertical reinforcements 41 between the side and end walls of the box as shown. The rub guards 20 are placed at the proper elevation so that when the truck is run in the aisle 12, the wide vertically disposed face of the plate 37 may contact either the machine base rail 14, if no guard rail is present, or it may contact or strike the guard rail if the truck is not run straight along the aisle. Thus the body of the truck box will be prevented from coming in too close to either of the machines between which it is being moved and possibly damaging some parts of the machine.

The small box 36 is narrower than the larger box 18, as is clearly shown in Fig. 6, and this smaller box is designed to be attached to the rear end of the larger box by means of mounting hooks 42 which are secured to the oposite sides of the smaller box and the hooks are adapted to be engaged over the transverse mounting plate 35 which is secured against one end of the large box.

The larger box is normally used for transporting filled packages and may, therefore, be referred to as the package box, and the smaller box 36 when attached to the package box is employed for carrying empty bobbins and may accordingly be referred to as the bobbin box.

As stated, the bobbin box is hung on the rear end of the package box to be entirely supported thereby and is not equipped with supporting rollers like the package box. Also the bobbin box normally is positioned so as to have one side wall, here designated 43, substantially in the plane of the right side wall 24 of the package box.

The wall 43 of the bobbin box has secured thereto, to lie in the same horizontal plane as the rub guard 20, a bumper which is generally designated 44. This bumper is also preferably in the form of a channel member having a wide flat face plate 45, the side flanges 46 and the edge mounting strips 47 which as shown are riveted to the wall of the bobbin box. The bumper 44 in effect corresponds to a short section of a channeled member similar to the rub guard 20 with the exception that the side flanges 46 are wider than the flanges 38 of the rub guard. Also, the bumper 44 is placed with the length vertical instead of horizontal like the rub guard, and due to the increased width of the flanges 46 over the flanges 38, the face plate 45 will stand out from the plane of the walls 24 and 43 slightly farther than the plate 37 of the rub guard.

The wheeled supporting means for the doff truck consists of two non-swiveling casters 48 and 49 and a pivoted or swiveling caster 50. The non-swiveling casters 48 and 49 are spaced apart transversely of the rear end of the doff truck for rotation on a common transverse axis line and the caster 49 is set in from the adjacent left side of the box at a slightly greater distance than the caster 48 is set from its side or the right side of the box as is shown in Figs. 2 and 4. The pivoted or swivel caster 50 is located adjacent to the front end of the package box or doff truck on the longitudinal center thereof and in addition the mounting plate portion 51 thereof is tilted slightly by having a chock member, such as a short bar 52, interposed between it and the underside of the truck frame or the box bottom as shown in Fig. 3, at the front side of the plate 51 so that this center caster will have its frame extended downwardly and rearwardly and it will, therefore, "track" or tend to swing around to run on a straight line.

By arranging the transversely spaced wheels or the wheels 48 and 49 in the manner shown and described, the wheel which is set farthest in from the side, here shown as the wheel 49, and which is on the side away from the spooler machine when the truck is in the aisle, allowance is made for the operator's feet as he works at the side of the box as this insetting of the wheel prevents the operator's feet from hitting the same during the working period.

In addition the rigid wheels or non-swiveling wheels are set in from the rear end of the box so as to allow the box to be conveniently guided from the rear when the bobbin box is detached or removed therefrom. This positioning of the non-swiveling wheels is adjusted so as to keep the empty bobbin box from tipping the larger box up when the large box is empty and the attached bobbin box is full of bobbins. The bumper on the bobbin box is set out slightly beyond the rub guard or is made approximately one-half inch wider than the rub guard to extend beyond the plane of the vertical plate 37 so as to cause the large box to run at its front end against the guard rail on the spinning frame or, in other words, to cause the box to tend to turn into the frame rather than allowing it to run out into the aisle and thereby making it necessary for the operator to force the box back toward the adjacent machine.

The placing of the spacer or chock 52 under the attaching plate 51 of the swivel wheel at the front end of the package box also assists in the job of keeping the box headed in at its front end toward the adjacent guard rail thus helping the operator to keep the box in the proper position while it is being used at the spooler machine, or winders, as desired.

With the empty bobbin container or bobbin receiver 36 mounted on the rear end of the package box in the manner illustrated in Figs. 5 and 6, the machine operator or attendant in pushing the two receptacles along, keeps the bumper of the bobbin container and the front end of the long bumper of the package box against the machine rub rail. With the swivel caster 50 at the front or forward end of the package receptacle or package box, the operator can easily guide the two units by pressing upon the bobbin container with his knees while using his hands to handle the bobbins.

The three wheeled arrangement allows the two rigid or non-swiveling wheels to be rolled into place in moving the boxes into position at the spooler and the swivel wheel at the forward end then makes it easy to swing that end of the box in to bring the box into parallel relation with the machine.

In addition to the rub guard functioning in the manner stated, it will be seen that it also provides additional stiffening or strength to the side wall of the box and also the distance which the rub guard stands out from the side wall may vary depending on whether or not it is to be used in aisleways where the machines have guards on the base rail.

It will also be apparent from the foregoing that by reason of the rub guard and bumper holding the boxes out away from the machine, the possibility of the boxes striking some part of the machine above the fender or guard rail and causing damage is eliminated.

In the illustrations forming Figs. 5 and 6 the bobbin box is shown detachably suspended on the rear end of the package box by means of the hook members 42 and cross bar 35. Use may be made of these cross bars 35 at the ends of the package box for coupling a number of the package boxes in tandem arrangement, if desired, it being understood, of course, that the bobbin box in that case would be removed. By placing the cross bars 35 of adjacent package boxes together, a suitable hook means, not shown, may be conveniently employed for joining the adjacent bars together.

In addition to the coupling together of a number of package boxes in tandem as above stated, these boxes may also be coupled together in side-by-side arrangement by extending a suitable coupling or hook means transversely of the ends in connection with the adjacent bars 35 or the package boxes may be grouped in fours with two tandem groups in side-by-side relation and by the use of a suitable hook bar or hook means, not shown, which could be connected with the four adjacently located or grouped cross bars 35.

It will also be understood that while in the illustration of the invention the package boxes are of the type in which there is the sloping upper portion 34 of the left side wall 26, and which package boxes are designed to be used at spooler machines which have inclined breast portions adjacent to and beneath which the inclined wall portions 34 will be located, the invention is also applicable to boxes in which both side walls are straight from top to bottom, which boxes would be employed in the aisleways between adjacent spinning machines.

I claim:

1. In equipment for use in connection with textile machinery, the new combination of a truck structure comprising a package box body having longitudinal side walls and transverse end walls, supporting rollers beneath and operatively coupled with the lower part of said box body, a rub guard extending longitudinally of one of said side walls and having a surface adapted for contact with a portion of a textile machine adjacent to which the truck is used, a bobbin box, means for mounting the bobbin box on one end of the package body, said bobbin box being mounted with one side wall substantially in the plane of said one side of the package body, and a bumper fender secured to said one side of the bobbin box in the horizontal plane of said rub guard and a projecting laterally beyond said horizontal plane to a slightly greater extent than said rub guard.

2. The invention according to claim 1 wherein said rub guard is of channel cross-sectional form having a relatively wide vertical face with bordering side flanges, and means rigidly securing said flanges to the said one side wall.

3. A truck structure for use in association with textile machinery having a horizontal rail, said truck structure comprising the new combination of a box body having externally plane surfaced longitudinal side walls and transverse end walls, a plurality of supporting rollers beneath and operatively connected with the box body, at least a pair of said supporting rollers being disposed in spaced relation transversely of the box body and spaced inwardly of one end and of the sides of the box body and at least one of said supporting rollers being disposed on the longitudinal center of the box body adjacent to and spaced inwardly from the other end thereof, the last mentioned roller being of the swivel type, a rub guard having longitudinal upper and lower bordering portions lying against and secured to and extending throughout the length of the outer side of a side wall of the box body and having a vertical face positioned outwardly from said side wall at an elevation for rubbing engagement with the said horizontal rail of said machine, a second box body, means for detachably coupling the second box body with one end of the first box body to be suspended thereon and said means positioning a side wall of said second box body substantially in the plane of the said side wall of the first box body, and a bumper guard secured to the said side wall of the second box body at the elevation of said rub guard and extending laterally from the plane of said side wall a distance slightly greater than the rub guard.

4. As a new combination in textile machine equipment, a truck supported box body adapted for passage along an aisle between adjacent textile machines, said body having side and end walls and at least the side walls thereof being externally plane surfaced, a rub guard extending longitudinally of such side wall and comprising a channel body consisting of a wide web portion bordered by longitudinal flanges and each flange joining a longitudinal mounting strip, said strips being positioned against and secured to the plane surface of the adjacent side wall to maintain the channel web vertically widthwise and the channel being directed toward the wall with the rub guard terminating at each end adjacent to an end wall, a support bar secured across and in spaced relation to an end wall, a second box body of slightly less height than the truck supported box body, support engaging hooks carried by the second box for suspending and supporting the second box on the first box entirely by said support bar, and a short bumper fender of the same cross-sectional form as the said rub guard and secured to a side of the second box with the channel extending vertically and with the web portion thereof lying in a plane located outwardly beyond the plane of the web portion of the rub guard.

References Cited in the file of this patent

UNITED STATES PATENTS

| | | |
|---|---|---|
| D.170,692 | Jacoby | Oct. 27, 1953 |
| 278,375 | Trexler | May 29, 1883 |
| 428,790 | Van Wagenen et al. | May 27, 1890 |
| 896,104 | Guhle | Aug. 18, 1908 |
| 918,810 | Bowers | Apr. 20, 1909 |
| 1,056,357 | Murdock | Mar. 18, 1913 |
| 1,451,858 | Zengerle | Apr. 17, 1923 |
| 1,706,267 | Van de Mark et al. | Mar. 19, 1929 |
| 1,915,173 | Vieregge | June 20, 1933 |
| 2,340,595 | Jones | Feb. 1, 1944 |
| 2,629,610 | Lied et al. | Feb. 24, 1953 |
| 2,673,671 | Williams | Mar. 30, 1954 |
| 2,676,729 | Neville et al. | Apr. 27, 1954 |
| 2,873,993 | Savke | Feb. 17, 1959 |